(12) United States Patent
Qiang et al.

(10) Patent No.: US 9,086,149 B2
(45) Date of Patent: Jul. 21, 2015

(54) CLIP EQUIPPED, ELONGATED FLEXIBLE POLYMER GASKETS

(75) Inventors: Mi Qiang, Jiangsu (CN); Gary L. Flasher, Spring City, PA (US)

(73) Assignees: Changzhou Sanyou Dior Insulation Materials Manufacturing Co., Ltd., Changzhou, Jiangsu (CN); Davlyn International Group, Ltd., Spring City, PA (US); Allied Century Limited, Kwai Chung. New Territories (HK)

( * ) Notice: Subject to any disclaimer, the term of this patent is extended or adjusted under 35 U.S.C. 154(b) by 1733 days.

(21) Appl. No.: 11/942,429

(22) Filed: Nov. 19, 2007

(65) Prior Publication Data

US 2009/0079141 A1   Mar. 26, 2009

Related U.S. Application Data

(60) Provisional application No. 60/866,369, filed on Nov. 17, 2006, provisional application No. 60/888,174, filed on Feb. 5, 2007, provisional application No. 60/988,593, filed on Nov. 16, 2007.

(51) Int. Cl.
    | | |
    |---|---|
    | *B23P 11/02* | (2006.01) |
    | *F16J 15/02* | (2006.01) |
    | *E06B 7/16* | (2006.01) |
    | *F16J 15/06* | (2006.01) |
    | *F24C 15/02* | (2006.01) |
    | *F16B 5/12* | (2006.01) |

(52) U.S. Cl.
    CPC .............. *F16J 15/027* (2013.01); *F16J 15/061* (2013.01); *F24C 15/021* (2013.01); *F16B 5/125* (2013.01); *Y10T 24/44026* (2015.01); *Y10T 29/49904* (2015.01)

(58) Field of Classification Search
USPC ......... 29/450, 888.3; 277/616, 630, 637, 640; 49/475.1, 480.1
See application file for complete search history.

(56) References Cited

U.S. PATENT DOCUMENTS

| | | | |
|---|---|---|---|
| 1,896,590 A | 2/1933 | Place | |
| 2,020,206 A | 11/1935 | Place | |
| 2,043,007 A | 6/1936 | Place | |
| 2,139,329 A * | 12/1938 | Fessler | ......................... 49/492.1 |
| 2,215,428 A | 9/1940 | Place | |

(Continued)

FOREIGN PATENT DOCUMENTS

GB           0681678 A     10/1952

*Primary Examiner* — Essama Omgba
(74) *Attorney, Agent, or Firm* — Panitch Schwarze Belisario & Nadel LLP

(57) ABSTRACT

An elongated, flexible polymer gasket includes a body formed by a length of tubular flexible polymer material, a hollow chamber within the body extending uniformly the length of the body, and a plurality of individual openings spaced apart from one another along the length of the body. The gasket further includes a plurality of individual spring clip fasteners, each formed of a metal wire, the length of wire being bent to form an elongated, generally planar base portion with opposing major sides and an elongated, engagement portion extending transversely away from one of the opposing major sides. The maximum width dimensions of the base and engagement portions being greater than a maximum nominal dimension of the opening whereby the each individual spring clip member is captured in a separate one of the openings with the base portion within the hollow chamber and the engagement portion projecting traversely away from the base portion and the body.

7 Claims, 10 Drawing Sheets

(56) References Cited

U.S. PATENT DOCUMENTS

| | | | | |
|---|---|---|---|---|
| 2,220,825 | A | 11/1940 | Place | |
| 2,389,635 | A * | 11/1945 | Place | 411/530 |
| 2,601,512 | A * | 6/1952 | Gagnier | 49/492.1 |
| 2,607,965 | A * | 8/1952 | Gagnier | 49/492.1 |
| 2,638,642 | A * | 5/1953 | Spraragen | 49/492.1 |
| 2,643,433 | A * | 6/1953 | Scott | 24/296 |
| 2,742,671 | A * | 4/1956 | Scott | 425/128 |
| 2,894,301 | A | 7/1959 | Scott | |
| 2,935,770 | A | 5/1960 | Gagnier | |
| 2,988,788 | A * | 6/1961 | Saponara | 49/492.1 |
| 3,059,299 | A * | 10/1962 | Sarafinas | 24/293 |
| 3,160,251 | A * | 12/1964 | La Penna et al. | 52/718.07 |
| 3,167,824 | A * | 2/1965 | Berwanger | 49/482.1 |
| 4,081,647 | A | 3/1978 | Torrey | |
| 4,538,381 | A * | 9/1985 | Vogel | 49/479.1 |
| 4,541,203 | A | 9/1985 | Naffrechoux et al. | |
| 4,615,094 | A * | 10/1986 | Kai et al. | 29/407.01 |
| 4,822,060 | A | 4/1989 | Moyer et al. | |
| 4,836,080 | A | 6/1989 | Kite, III et al. | |
| 4,979,280 | A | 12/1990 | Weil | |
| 4,986,033 | A | 1/1991 | Weil | |
| 4,989,422 | A | 2/1991 | Barlow et al. | |
| 5,066,028 | A | 11/1991 | Weil | |
| 5,082,297 | A | 1/1992 | Flasher | |
| 5,107,623 | A | 4/1992 | Weil | |
| 5,186,992 | A | 2/1993 | Kite, III | |
| 5,197,370 | A | 3/1993 | Gladfelter | |
| 5,205,075 | A | 4/1993 | Moyer | |
| 5,289,658 | A * | 3/1994 | Lusen et al. | 49/492.1 |
| 5,307,591 | A * | 5/1994 | Usuta et al. | 49/476.1 |
| 5,341,601 | A | 8/1994 | Moyer | |
| 5,395,126 | A | 3/1995 | Tresslar | |
| 5,806,149 | A | 9/1998 | Schultz et al. | |
| 5,915,698 | A * | 6/1999 | James | 277/637 |
| 5,918,885 | A | 7/1999 | Radke, II | |
| 6,386,619 | B1 * | 5/2002 | Tsuchida | 296/146.9 |
| 6,393,766 | B2 * | 5/2002 | Nozaki et al. | 49/498.1 |
| 6,405,489 | B1 * | 6/2002 | Miura | 49/479.1 |
| 6,533,289 | B2 | 3/2003 | Bono, Jr. et al. | |
| 6,537,182 | B2 * | 3/2003 | Slawinski et al. | 482/104 |
| 6,601,346 | B2 * | 8/2003 | Nozaki | 49/498.1 |
| 6,893,025 | B2 * | 5/2005 | Hight et al. | 277/630 |
| 7,093,838 | B2 | 8/2006 | Hight, Jr. et al. | |
| 7,104,546 | B2 * | 9/2006 | Bono, Jr. | 277/640 |
| 7,124,540 | B2 * | 10/2006 | Qiang | 49/492.1 |
| 7,464,461 | B2 * | 12/2008 | Hight et al. | 29/889.3 |
| 7,735,836 | B2 * | 6/2010 | Bono, Jr. | 277/630 |
| 8,601,646 | B2 * | 12/2013 | Wang | 24/296 |
| 2004/0094905 | A1 * | 5/2004 | Weil | 277/628 |
| 2005/0155294 | A1 * | 7/2005 | Masuda et al. | 49/498.1 |
| 2007/0163182 | A1 * | 7/2007 | Morihara | 49/492.1 |

* cited by examiner

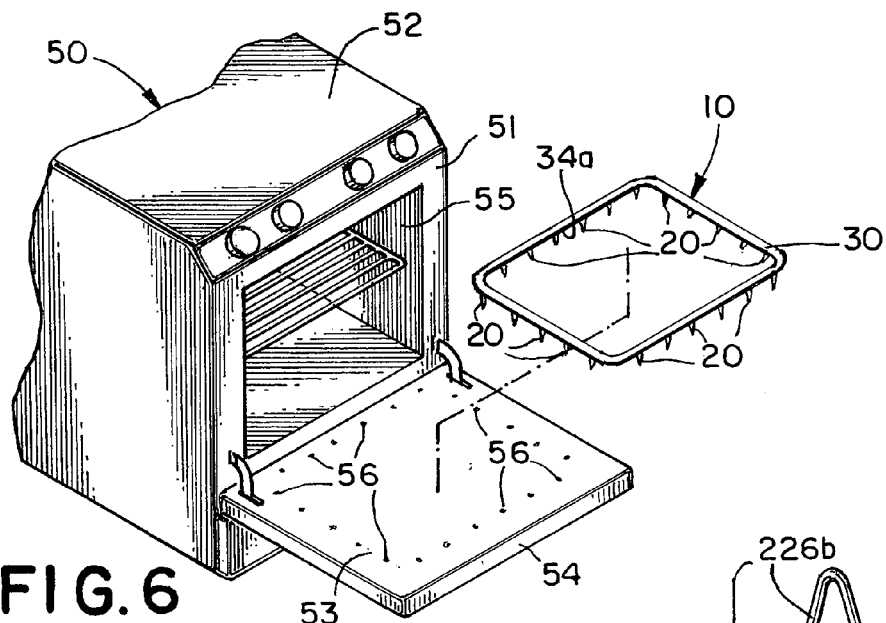
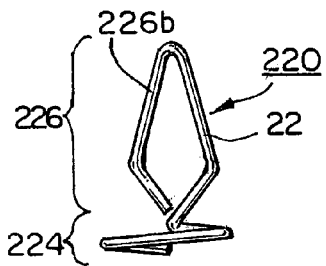
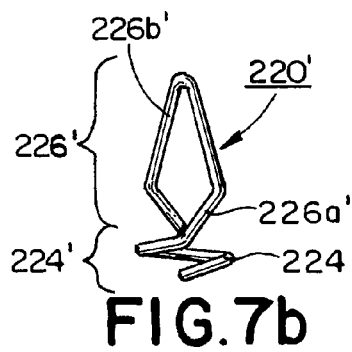
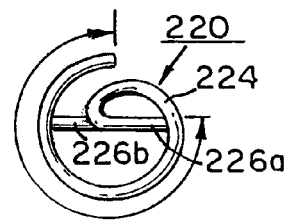
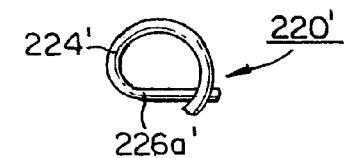
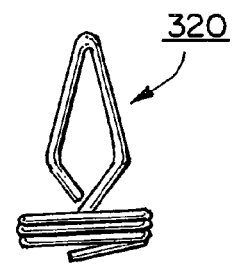
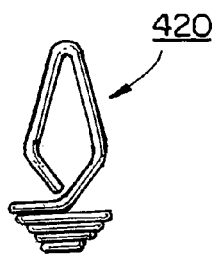
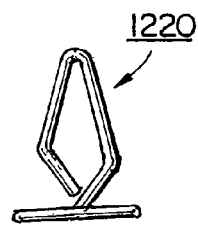

US 9,086,149 B2

CLIP EQUIPPED, ELONGATED FLEXIBLE POLYMER GASKETS

CROSS-REFERENCE TO RELATED APPLICATIONS

This patent application claims priority to U.S. Provisional Patent Application No. 60/866,369, filed Nov. 17, 2006, entitled "Clip Equipped, Plastic Appliance Gasket"; U.S. Provisional Patent Application No. 60/888,174, filed Feb. 5, 2007, entitled "Clip Equipped, Plastic Appliance Gasket" and U.S. Provisional Patent Application No. 60/988,593, filed Nov. 16, 2007, entitled "Clip Equipped, Elongated Flexible Polymer Gaskets", the disclosures of which are incorporated herein by reference.

FIELD OF THE INVENTION

The present invention relates to sealing devices and, in particular, to individual clip equipped, flexible polymer gaskets, particularly for use in thermal insulation and/or moisture penetration prevention.

SUMMARY OF THE INVENTION

In one aspect, the invention is an elongated, flexible polymer gasket comprising: an elongated flexible body formed by a length of tubular polymer material, the body including an outer wall of the polymer material at least partially surrounding and at least partially defining a hollow chamber within the body extending uniformly the length of the body, and further including a plurality of individual openings spaced apart from one another along the length of the body and extending through the outer wall and into the hollow chamber; and a plurality of individual spring clip fasteners, each spring clip fastener being formed by a length of at least partially hardened metal wire having a rounded cross section, the length of wire being bent to form an elongated, generally planar base portion with opposing major sides and an elongated, engagement portion extending transversely away from one of the opposing major sides of the base portion, the base portion of each individual spring clip fastener having a maximum length dimension in an elongated direction of the base portion and a maximum width dimension less than the maximum length dimension in a direction at least generally perpendicular to the elongated direction of the base portion, the engagement portion of each individual spring clip fastener having a maximum length dimension in an elongated direction of the engagement portion at least transverse to the elongated direction of the base portion, and a width dimension less than the maximum length dimension of the engagement portion in a direction at least generally perpendicular to the elongated direction of the engagement portion, the engagement portion having a proximal end abutting the base portion with a reduced width dimension less than the maximum width dimensions of the engagement portion and the base portion, the maximum width dimension of each of the base portion and the engagement portion being greater than a maximum nominal dimension of the opening whereby each individual spring clip fastener is captured in a separate one of the openings with the base portion of each spring clip member captured within the hollow chamber of the body and the engagement portion of each spring clip member projecting transversely away from the base portion and away from the opening and the outer wall of the body.

In another aspect, the invention is an elongated, flexible gasket comprising the steps of: providing an elongated, flexible body formed by a length of tubular flexible polymer material, the body including an outer wall of the polymer material at least partially surrounding and at least partially defining a hollow chamber within the body extending uniformly in cross sectional shape and dimension along the length of the body; providing a plurality of openings spaced apart from one along the length of the body passing through the outer wall and into the hollow chamber and inserting into each opening, a base portion of one of a plurality of individual spring clip fasteners, such that the base portion of each fastener is captured within the hollow chamber and an engagement portion of each fastener extends out of the body, transversely away from the base portion and away from the opening and the outer wall of the body, each of the base portion and the engagement portion of each clip having a maximum length dimension and the maximum width dimension in a direction perpendicular to the length dimension and smaller than the length dimension, the maximum width dimension of the base portion and a maximum width dimension of the engagement portion each being greater than the maximum nominal dimension of the opening.

The gasket bodies are preferably but not necessarily extrusions of elastomeric polymers. While particularly useful in appliances for sealing against moisture or thermal air transfers, such gaskets also find uses in vehicles of various types and in building components with movable elements such as framed windows and doors, which are normally weather-stripped.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

FIG. 6 shows an individual clip equipped thermal device of the present invention being installed as a gasket in a home appliance, in particular, a non-self cleaning home cooking oven;

FIGS. 7a and 7b are front elevation views of versions of a helix and spiral base individual spring clip where the courses are spaced apart;

FIGS. 8a and 8b are bottom plan views of the clips of FIGS. 7a, 7b, respectively; and FIGS. 9 and 10 are front elevation views of respective versions of a helix and spiral base individual spring clip where the courses are abutting;

FIG. 11 is a front elevation of a spiral base clip where the spirals extend outward in a single plane from a central portion of the wire at the base of the dart.

DETAILED DESCRIPTION OF THE INVENTION

Figure 1:
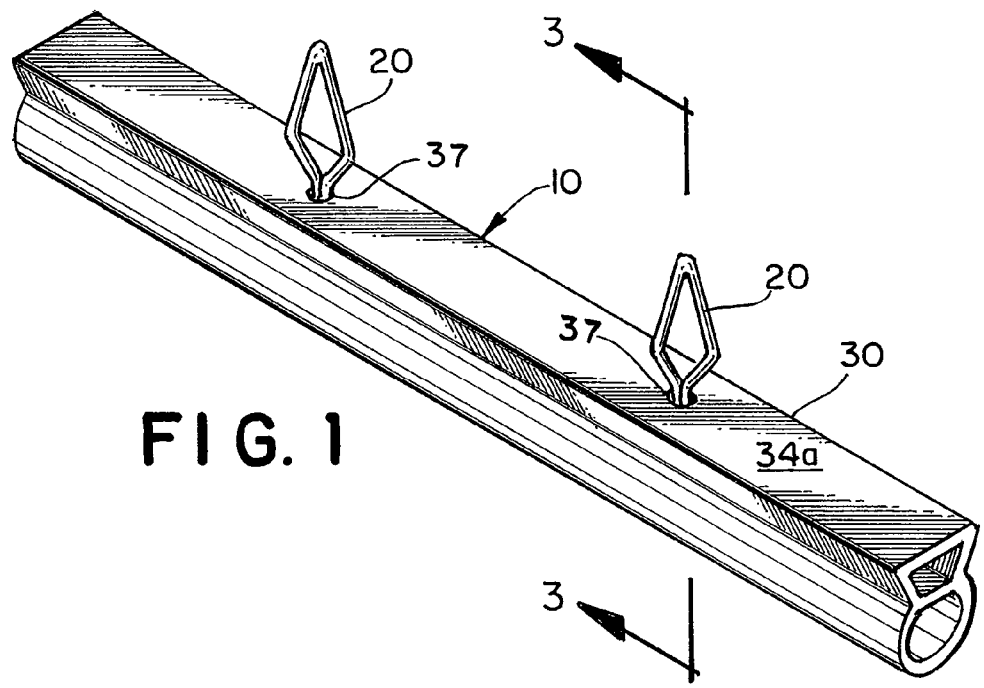
FIG. 1 is a perspective view of a first embodiment sealing device according the present invention.

FIG. 1 depicts a sealing member in the form of an elongated, flexible polymer gasket indicated generally at 10. The member or gasket 10 depicted is an exemplary appliance gasket, but the invention is applicable to other types of gaskets including but not limited to gaskets around doors and other openings in cars and other vehicles and building components such as doors and windows prefabricated with frames and weatherstripping for various types of buildings. The member 10 includes an elongated flexible body 30 formed by a length of tubular polymer material, preferably an elastomeric extrusion of uniform cross sectional size and shape and fastening means in the form of a plurality of individual spring clip fasteners 20 mounted to the body 30 in a manner to be described.

Figure 2A:
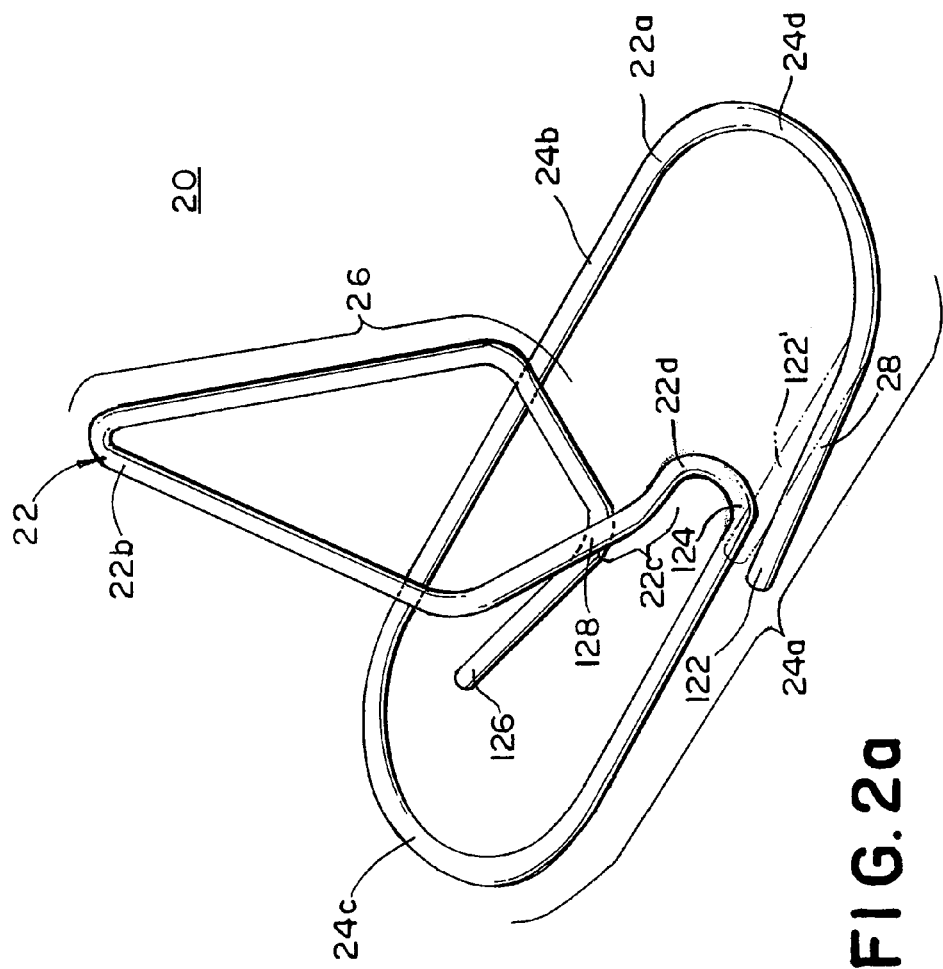
FIGS. 2a, 2b and 2c are perspective, side elevation and plan views, respectively, of a first individual spring clip member which can be used in the sealing device of FIG. 1.
Figure 2B:
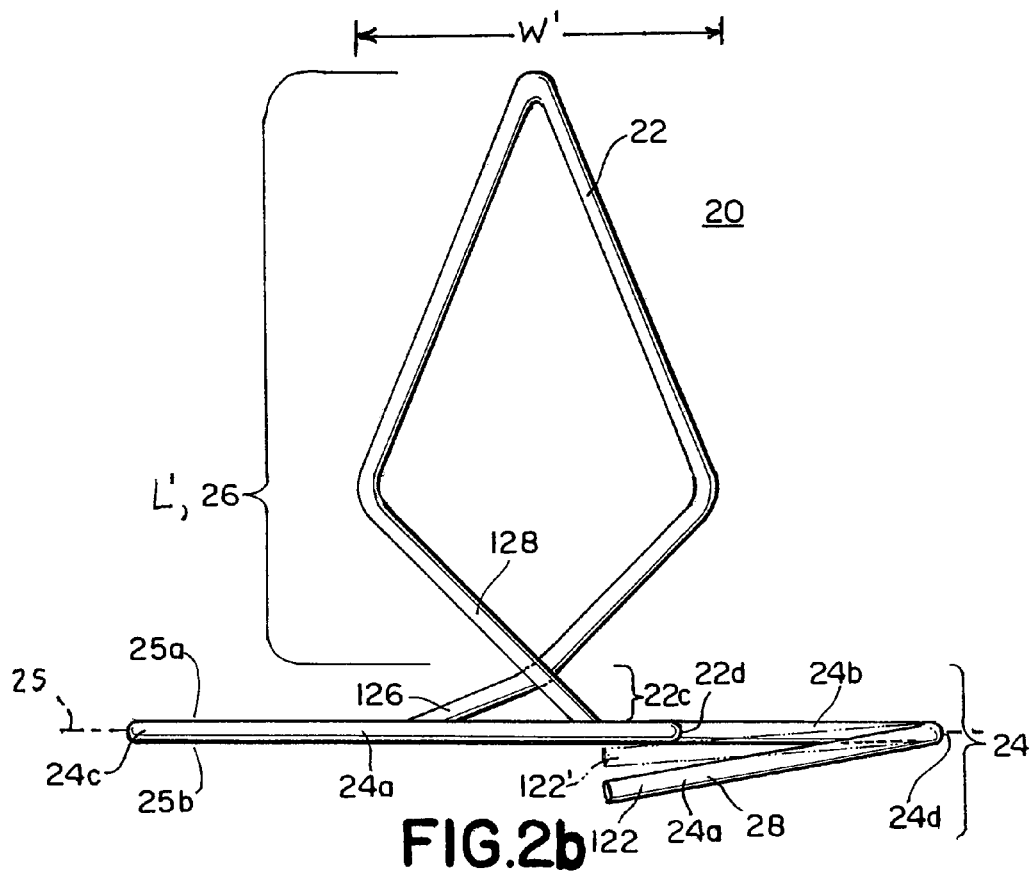
Figure 2C:
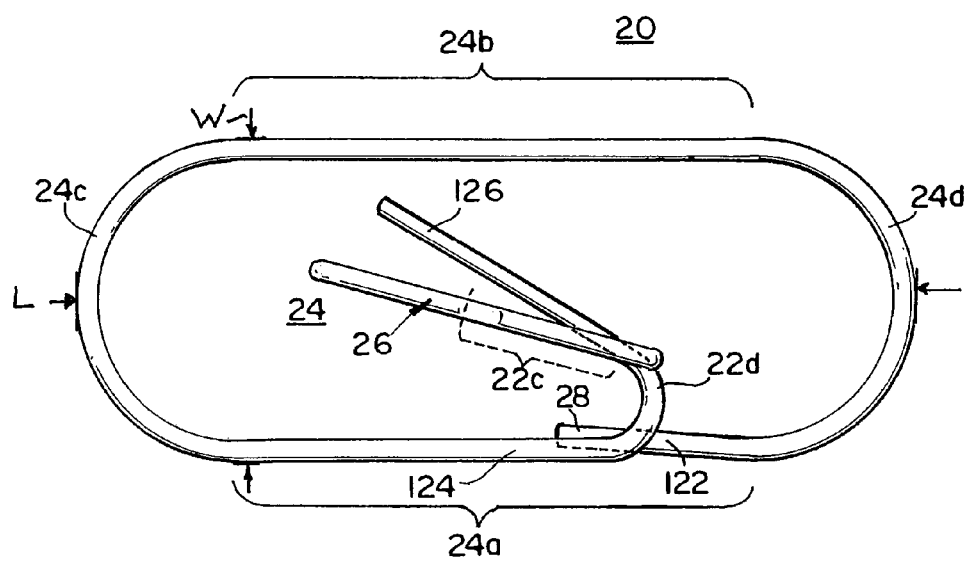

FIGS. 2a-2c are three views of a first, preferred version of an individual spring clip fastener (or simply "spring clip") again indicated generally at 20, which can be used in the present invention. Spring "clip 20" is preferably made from a single length of at least partially (e.g. one quarter) hardened to full hardened, rounded, preferably circular or oval cross-section wire 22, for example, a length of diamond drawn, type 304 stainless steel, about one-half millimeter (preferably twenty-five mils) more or less in diameter. Other 300 and 400 series stainless steel wires would also do. The wire can be hardened before, during or after bending.

Spring clip fastener 20 has an elongated base portion or "base" 24 that is generally planar, and defines a base plane 25 with opposing generally planar major sides 25a, 25b (FIG. 2b) and an elongated engagement portion or "dart" 26 projecting transversely and preferably generally perpendicularly away from one major side 25a of the base 24 generally perpendicularly. A first end section 22a of the single length of wire 22 is bent, preferably looped, to form the base 24 while a second and opposing second end section 22b is bent to form the dart 26. The two sections 24, 26 are connected by a comparatively small central section or "neck" 22c and an adjoining "bridge" section 22d of the length of wire 22.

The preferred base 24, which is also generally planar, is distinctly elongated, suggestedly in the form of an elongated track. The base 24 has two longer opposing sides or length portions 24a, 24b that are preferably but not necessarily generally straight and parallel, at least in plan view. Each pair of adjoining ends of straight sides 24a, 24b is connect by a separate one of a pair of opposing curved sides or ends 24c, 24d. More than one-half and approximately three-quarters of the base 24 is truly planar but the distal end 122 of the first end section 22a of the wire 22 (distal to the central and bridge sections 22c, 22d along the length of the wire 22) may be turned below that truly planar portion of the base 24 and the major side 25b (opposite the major side 25a facing the dart 26), where that distal end 122 approaches the proximal end 124 of that wire section 22a, if desired, for one installation methods to be described with respect to FIGS. 4a-4j. The distal end 122 may stop short of overlap with or about the proximal end 124 or, preferably, the distal end 122 may overlap that proximal end 124 as depicted. In either version, if the distal end 122 turns away from the plane of the base 24, it defines a tag end or simply "tag" 28 of the clip 20 and base 24 on the second, remaining major side 25b of the base 24 opposite the major side 25a of the base 24, from which the dart 26 extends. The base 24 has a maximum length dimension L in an elongated direction of the base portion and a maximum width dimension W less than the maximum length dimension L in a direction at least generally perpendicular to the elongated direction of the base. As can be seen in these figures, the preferred dart 26 is generally planar and rhomboidal or diamond shape but it will be appreciated that any generally bulbous shape that is tapered on either end of an enlarged mid-section, both distal and proximal to the base 24, can be used. The engagement portion 26 of each individual spring clip 20 has a maximum length dimension L' in an elongated direction of the engagement portion, which direction is at least transverse and, preferably generally perpendicular to the elongated direction of the base 24, and a maximum width dimension W' in a direction of at least generally perpendicularly to the elongated direction of the engagement portion 26.

The central section or neck 22c lies at the intersection of the planar portions of the base 24 and dart 26 and, more particularly, at the proximal end of the dart 26, at and/or below the point of closest approach of the opposite ends 126 and 128 of the second section 22b of the wire forming the dart 26. The central section 22c may or may not be delineated by a bend or other change in direction of the wire 22 as it transitions from section 22b to section 22c. The central section 22c supports the dart 26 at approximately the center of the base 24, extending away from one major side 25a of the base. The adjoining bridge section 22d is preferably curved within the base 24 and extends from the lowermost portion of the central section 22c, approximately at the center of the base 24, to the outer perimeter formed by the first wire section 22a defining the base 24. The distal (free) end 126 of the second portion 22b of the wire 22 could terminate short of the contact with the proximal end 128 of second portion 22b or somewhere along the height of the dart 26. The distal end 126 may extend toward but not reach the proximal end 128, may abut the proximal end 128 or may extend past the proximal end 128. In that configuration, the distal end 126 is crossed over (i.e. overlapped with) the proximal end 128 of the wire section 22b (which transitions into the central portion 22c) and is bent proximal to or below the central section 22c so as to extend into the open center of the base 24 in a direction preferably opposite the direction of the bridge section 22d as it extends away from the central section 22c, where it can provide added spring support as will be explained.

Figure 3:
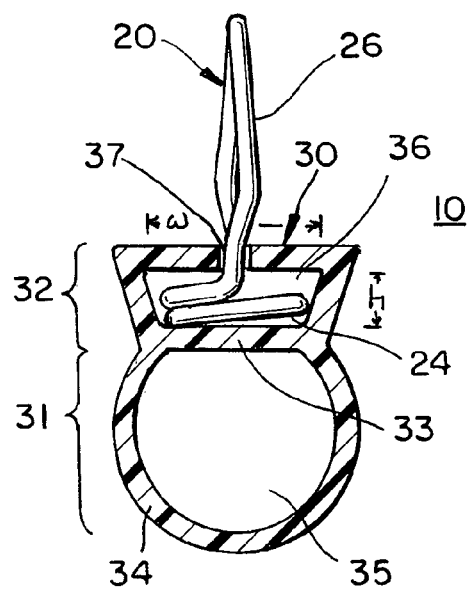
FIG. 3 is a cross-sectional view of sealing member of FIG. 1 taken along the lines 3-3.

FIG. 3 is a cross-sectional view of one embodiment exemplary elongated, flexible polymer gasket type sealing member 10. The gasket body 30 is formed from a length of conventional, flexible plastic material of a type commonly used in such sealing members, preferably, a natural rubber or synthetic rubber or other man-made elastomer. For use in non-self cleaning home ovens, the body 30 is preferably made from silicone rubber, which remains integral at temperatures up to about 260 degrees Centigrade (500 degrees Fahrenheit). For other appliances such as refrigerators and freezers, other types of natural and synthetic rubbers and materials such as formulations of vinyl or butyl or acrylic or neoprene or various blends such as ABS (acrylonitrile butadiene styrene) and EPDM (ethylene propylenediene monomer) are common and can be used. Also, flexible PVC (polyvinyl chloride), other styrene and diene elastomers and blends may be used. The gasket body 30 preferably is a one piece extrusion with two parts monolithically connected side by side, running parallel with one another: a tubular, sealing layer or section 31 and a tubular, mounting or supporting layer or section 32. They could be but do not need to be coextrusions. The depicted sections 31, 32 share a common inner wall 33 that extends between opposite sides of a preferably continuously circumferential outer wall 34 of the body 30. Collectively, the walls 33, 34 define two adjoining hollow chambers or cavities 35, 36, chamber/cavity 35 being part of the sealing section 31 and chamber/cavity 36 part of mounting/supporting section 32. Each of the chambers 35, 26 extends uniformly in cross sectional shape and dimension along the length of the body 30. Preferably, one side 34a of the outer uniform wall 34 forming part of the mounting/supporting section 32, and which is distal to the inner wall 33, is configured for reception of the individual spring clip members 20 and mounting of the gasket 10 to an appropriate support or support surface. The one side 34a of the depicted embodiment body 30 is preferably sufficiently flat to mount the member 10 on an at least generally planar support surface in a sealing manner with respect to that surface. Other flexible gasket mating shape geometries (e.g. radii, V's, U's, etc) and any of an almost innumerably variety of hollow gasket configurations could be used. The one side 34a of the outer wall 34 has a series of small openings like pinhole opening 37 (see various figures) spaced along the length of the body 30 and member 10, extending through the outer wall 34 and into the chamber 36. Each opening 37 receives the central section 22c of one clip 20. The engagement portion 26 of the clip on one side of the central section 22c is exposed on the outside of the body 30, the outer wall 34 and member 10, where it extends traversely away from the base 24 and away from the respective pinhole opening 37 and the one side 34a of the outer wall 34. The base 24 is captured within the body 30, in particular, preferably captured in the hollow chamber/cavity 36. Preferably, the width ω of the base 24 is at least one half the maximum width ω of the supporting section chamber 26 and is preferably approximately equal to the maximum width ω of the chamber 36. Preferably too, the maximum height H of the base portion 24 is at least one-half the maximum h of the chamber 26, (FIG. 4J) and is preferably about the same height as the maximum height h of the chamber 36 (FIG. 3).

Figure 4A:
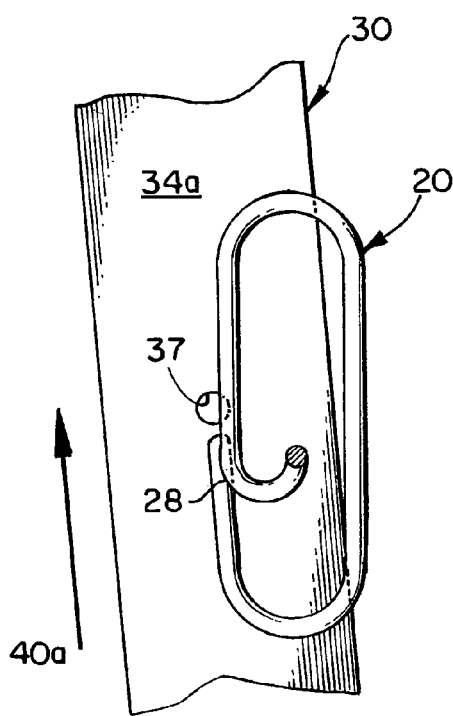
FIGS. 4a-4i depict the steps of inserting the individual spring clip of FIGS. 2a-2c into the gasket body of FIGS. 1 and 3.
Figure 4B:
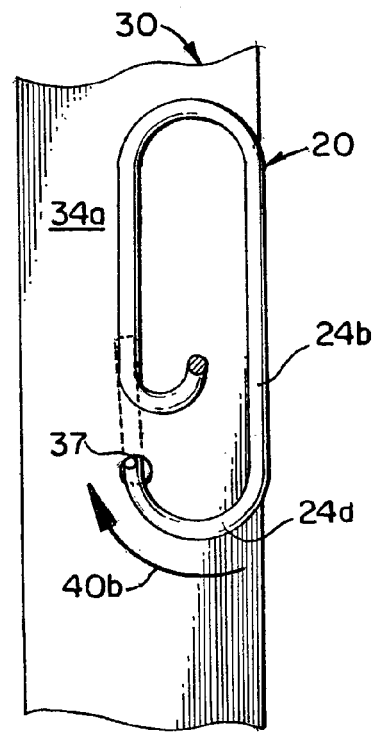
Figure 4C:
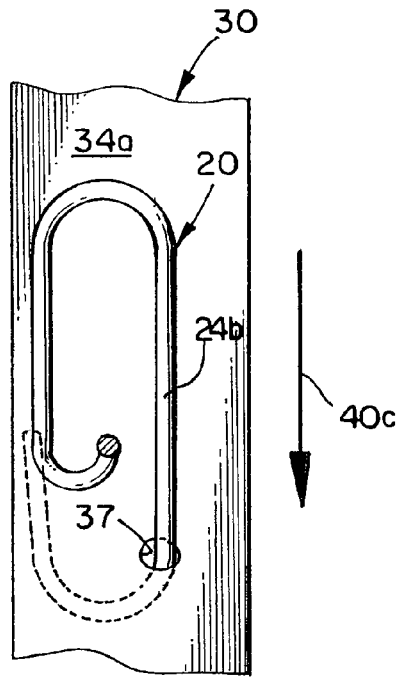
Figure 4D:
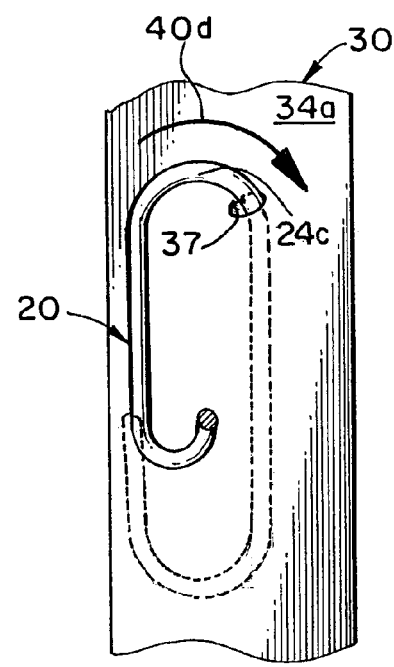
Figure 4E:
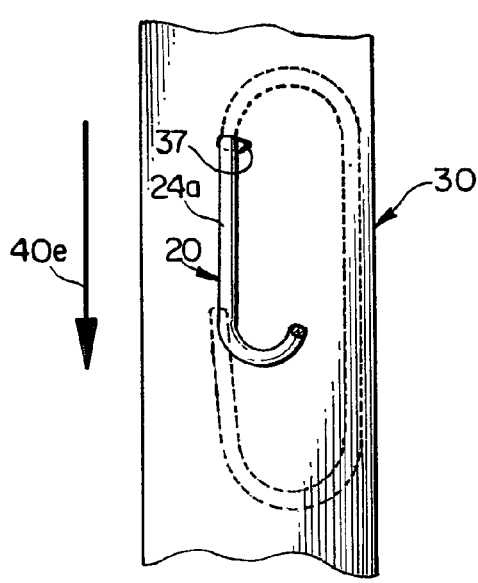
Figure 4F:
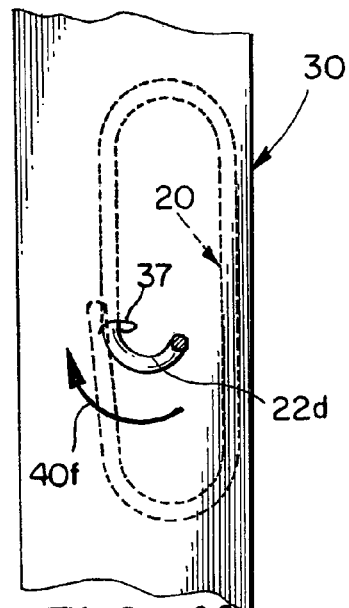
Figure 4G:
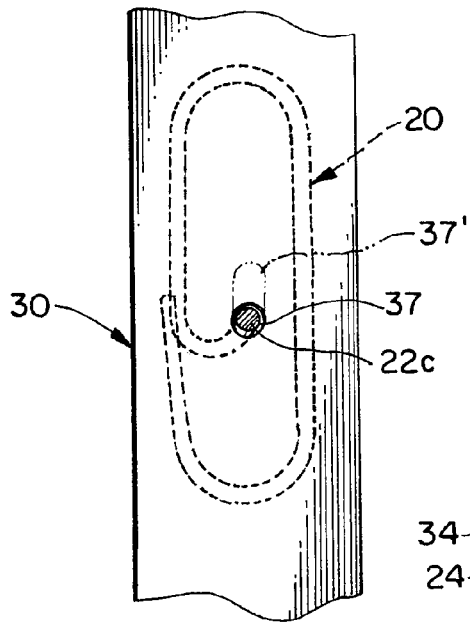
Figure 4H:
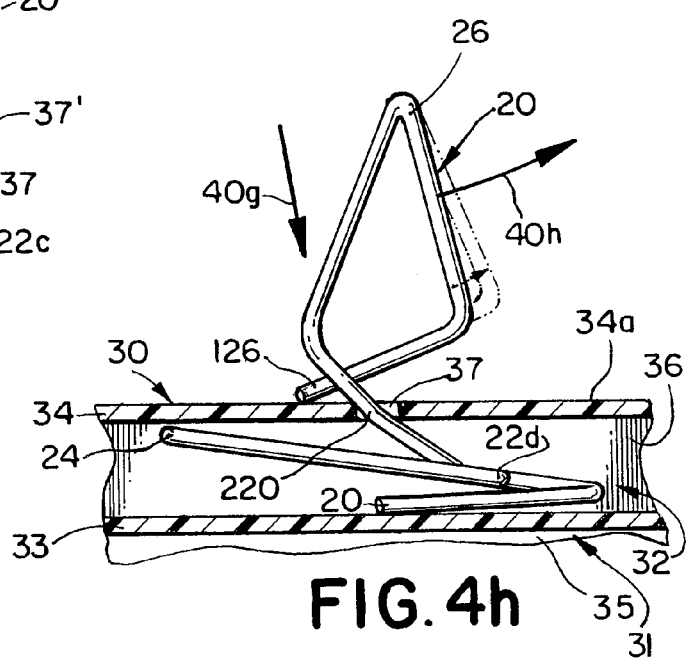
Figures 4I, 4J:
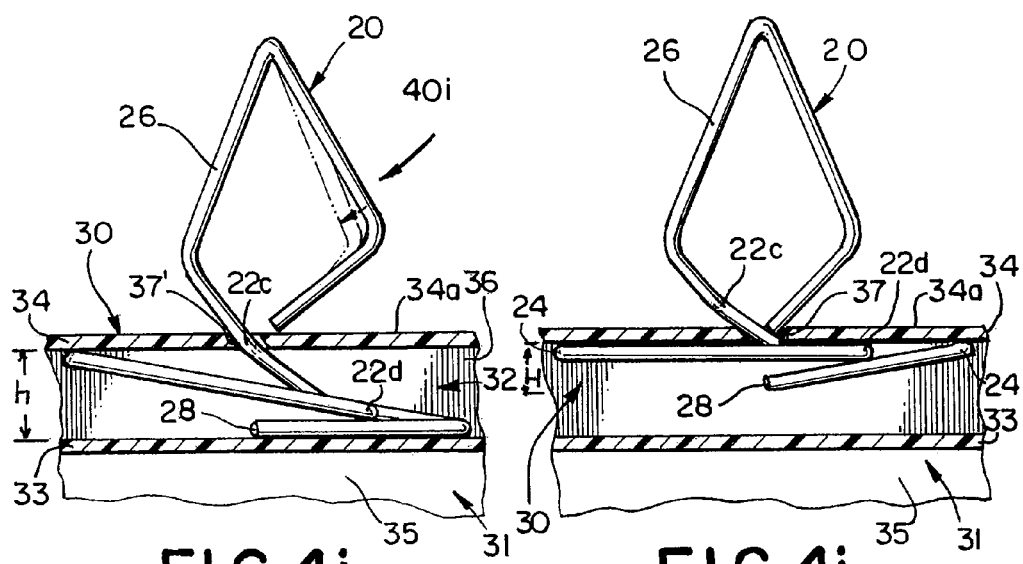
FIG. 4j depicts the fully inserted clip.

FIGS. 4a-4i show in simplified views, the steps of a first method that can be used to install the clips 20 in the body 30 to make the member 10. In FIGS. 4a-4g, which are plan views of the outer side 34a, the engagement portion 26 of the clip 20 is removed in order to more clearly see the base 24 and the pinhole opening 37. The pinhole opening 37 has a maximum nominal dimension which is the diameter or maximum cross sectional dimension of the opening when it is not being stretched or otherwise deformed which dimension is indicated as FIG. 5a. The engagement portion 26 is depicted with the base 24 in FIGS. 4h-4j, which are side elevations. In FIG. 4a, the tag 28 is inserted into the pinhole opening 37 receiving the clip 20 and the clip 20 is moved in the direction of arrow 40a with respect to the pinhole opening 37 (or the body 30 moved in the opposite direction of arrow 40a with respect to the clip, or both moved together) to an end of the first long side 24a. The clip 20 is then moved in the direction of arrow 40b in FIG. 4b with respect to the body 30 to insert a second curved end 24d into the pinhole opening 37. The following movements are similarly illustrated in FIGS. 4c-4f where the clip 20 is moved with respect to the body 30 in the direction of the corresponding arrow 40c-40f of each figure (or the body 30 moved in the opposite direction with respect to the clip 20) to insert (c) the longer long side 24b, (d) the other curved end 24d, (e) the remainder of the first longer side 24a and (f) the bridge section 22d into the pinhole opening 37. At FIG. 4g, the wire 22 proximal the central portion 22c in inserted down into the pinhole opening 37 in the direction of arrow 40g. If a free end 126 of a dart 26 is provided crossing the proximal end 128 of the wire 22, it too must be inserted into the pinhole opening 37 so that it can be used to apply a lateral (radial) force to the pinhole opening 37 to stretch and elongate the pinhole opening to the condition 37' depicted in FIGS. 4g and 4i. Referring to FIG. 4h, the free half (distal portion) of the dart 26 is firmly grasped (if necessary by a pair of pliers or similar tool) to draw the tip of the free distal end 126 of the of the wire 22 back toward the pinhole opening 37 while stretching the pinhole opening 37 in the same direction until that tip of the free distal end 126 can be inserted into the elongated hole opening 37' as depicted in FIG. 4i. The elongated hole opening 37' is also depicted in FIG. 4g in phantom. The end 126 of the wire 22 is then released or pushed in the direction of arrow 40i to insert the distal end 126 of the wire through pinhole 37' and into the hollow chamber 36. FIG. 4j illustrates the fully inserted clip 20 showing the respective positions of the dart 26 and the base 24 with respect to the pinhole opening 37.

What is significant about this construction is it provides a relatively larger base 24 within the gasket body 30 than can be provided by wire clip with a circular base that is twisted into a body 30. Furthermore, the insertion movements 40a-40f are all linear in a plane essentially parallel to the plane of the base 24 or in a direction perpendicular to that plane. The material of the body 30 need not be elastic. To some extent, the spring wire of the clip can deform or deflect to permit insertion of the base 24. Where the body 30 is substantially or essentially inelastic, the width ω of the base 24 will need to be about one-half the width ω of the chamber 36 but may be more depending upon how much flexibility is provided by the body material and base, and/or how large the opening 37 is. The material of body 30 would need only be sufficiently elastomeric to stretch approximate fifty-percent for the clips 20 to be accommodated in a chamber 36 with a width ω equal to the maximum width ω of the base 24 and with a pinhole opening 37 in the center of the width ω using the insertion method of FIGS. 4a-4j. The clip 20 will seat with the central section 22c in the pinhole opening 37, the central section 22c having a smaller cross section in plan view (looking along the central axis of the pinhole opening 37) than either the base 24 or the dart 26. Moreover if the planar footprint of the central portion (130 in FIG. 2c) has a larger maximum dimension that is larger than the unstressed or nominal diameter or other maximum cross sectional dimension of the pinhole opening 37, then the pinhole opening 37 will be stretched and under constant tension, biasing the central portion 22c to center itself vertically in the pinhole opening 37.

Figure 5A:
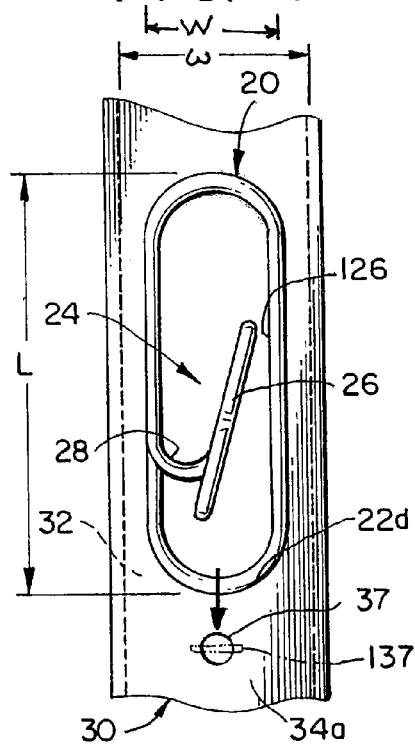
FIGS. 5a-5f depict the steps of an alternate method of inserting the individual spring clip like or similar to that of FIGS. 2a-2c into the gasket body of FIGS. 1 and 3.
Figure 5B:
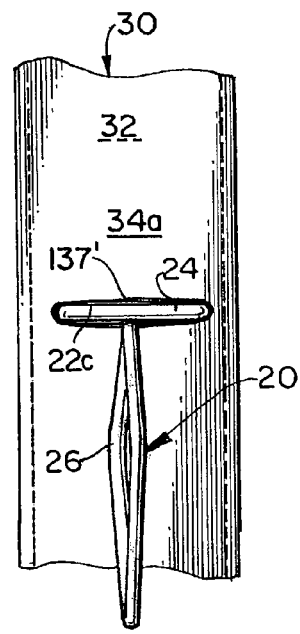
Figure 5C:
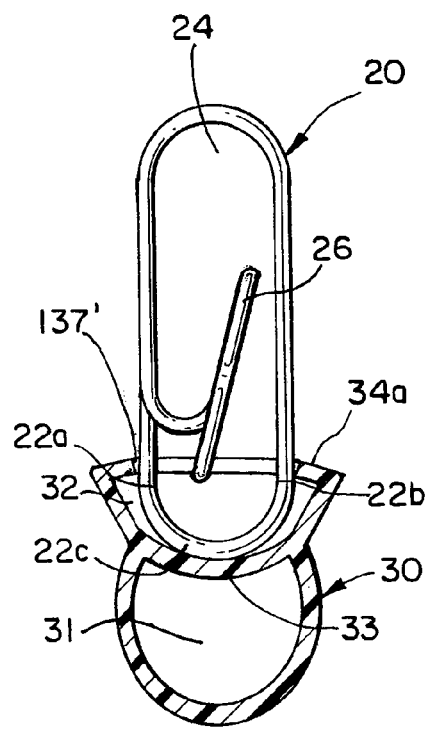
Figure 5D:
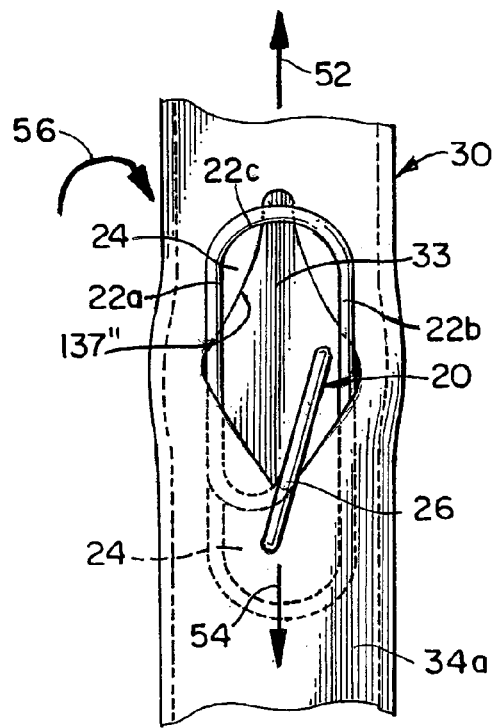
Figure 5E:
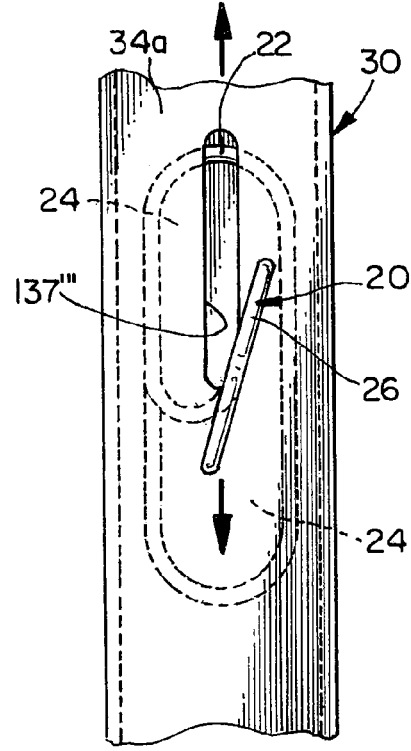
Figure 5F:
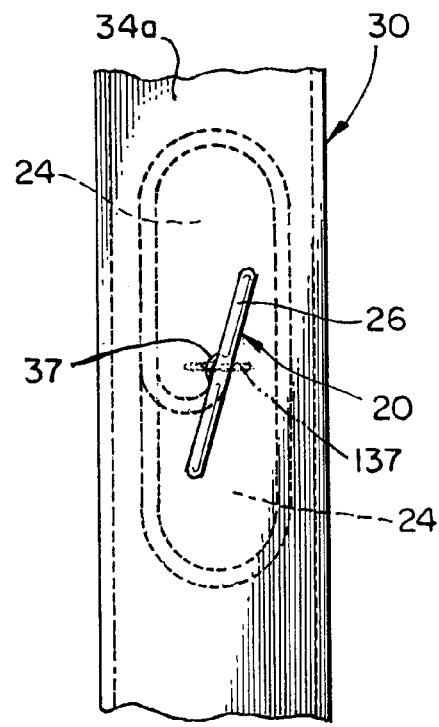

FIGS. 5a-5f depict in simplified views, a second, somewhat different method to make the appliance gasket 10 where the elongated, hollow gasket body 30 is composed of a material sufficiently elastomeric to perform the following steps without damage. Extruded silicone, butyl and other rubbers can be selected to perform these steps. The gasket body 30 is provided by a length of elastomeric polymer material with a plurality of pinhole openings 37 spaced along one side 34a of the length of the gasket body 30. Only one pinhole opening 37 is depicted in FIGS. 5a-5f, the insertion of other spring clip members 20 into the other pinhole opening are identical. In FIG. 5a, spring clip member 20 with base portion 24 and engagement portion 26 is positioned with one of the shorter curved ends 22c or 22d against the pinhole opening 37. Curved end 22d is preferred because the tag 28 and the distal end 126 face away from the pinhole opening 37. In FIG. 5b, the curved end 22c is forced into the pinhole opening 37, stretching it into the laterally elongated slot opening 137' sufficiently wide for that end 22d to enter the slot opening 137'. FIG. 5c is an end view of the clip 20 and gasket body 30 of FIG. 5b showing the curved end 22d and portions of the longer walls 22a and 22c of the clip base 24 passed through the laterally elongated slot opening 137' and into the tubular mounting/support section 32 of the gasket body 30. As can also be seen in that figure, the common elastomeric inner wall 33 will also deform, if necessary, to accept the end 22d of the clip 20 in chamber 32. Referring next to FIG. 5d, the gasket body 30 is stretched in its elongated longitudinal direction 52 by moving the clip and or body 30 away from the other. For example, the clip 20 may be held stationary or moved in an opposite direction 54 in order to also elongate the hole longitudinally and laterally stretched into opening 137" in FIG. 5e and subsequently or at the same time, the portion of the base 24 that remains exposed is pushed into the opening 137" (which now has a generally rhomboidal shape) stretching the 137" opening longitudinally until curved end 22c and thus the entire base 24 is passed through the opening 137" and is received in the hollow chamber 36 of the tubular mounting/ support section 32 of the gasket body 30 as depicted in FIG. 5e. As is also depicted in that figure, as the base 24 passes through the elongated, rhomdoidal hole 137" of FIG. 5d into the gasket body 30, the elongated sides of the hole 137" come together to eventually form a now longitudinally elongated slot 137''' when the entire base 24 is received in the body 30. In FIG. 5f, the elastomeric material of the gasket body 30 is permit to relax whereby the pinhole opening 37 returns towards it original size and shape such that the base 24 remains captured within the hollow chamber 36 of the gasket body 30 while the engagement portion 26 is exposed outside the gasket body 30, extending away from the one side 34a of the gasket body, the opening 37 and the base 24 of clip fastener 20.

Preferably, the cross-sectional area of the central portion 22c of the clip 20 is larger than the area of the pinhole opening 37 whereby the pinhole opening 37 is not permitted to relax entirely and return fully to its original size and shape but instead compresses on the clip 20 and biases the central portion 22c, which has the smallest area of the clip in plan view, to center in the pinhole opening 37 and in hollow chamber 36. Preferably, the width ω of the tubular mounting/ support section 32 of the gasket body 30 is about the same as the width ω of the base 24 of the clip 20 and distinctly smaller than the length L of the base 24 of the clip 20 so that the base 24 at least essentially fills the cross sectional internal width ω if not also the cross sectional internal height h of the tubular mounting/support section chamber 36 as depicted in FIG. 3.

This method of construction permits the use of a spring clip fastener, like clip fastener 20, having an elongated base 24, with a maximum length L, which is much longer than the width ω of the chamber 36 or other hollow interior of the gasket body 30 receiving the base 24 and even longer that a maximum cross-sectional dimension of the gasket body 30, thereby enhancing the stability of the clip 20 in the body 30 and providing a greater area in the base 24 to press against the side 34a of the outer wall 34 to more securely hold the gasket 10 against the surface on which it is mounted. Suggestedly, the maximum length L of base 24 is about twice as great and preferably about three or more times as great as the larger of the maximum width ω of the chamber 36 and ω of the base 24. Furthermore, with this method of installation, the tag end of the base section 22b of the wire 22 does not have to be provided and, in fact, it is even suggested that the distal free end of the bridge section 22d of the wire 22 be lapped against the end of the base section 22c of the wire 22 meeting the bridge section 22d as shown in phantom at 122' in FIGS. 2a and 2b.

While an individual wire spring clip 20 with an elongated and generally planar base 24 is preferred, the base of such clip could be of a different configuration, oval or rounder or actually circular, particularly for the clip installation method of FIGS. 5a-5f. The wire section 22b forming the base can be overlapped helically or spirally (in from a bridge portion 22d or out from a central portion 22c). Such base may be essentially planar with the helical courses vertically abutting one another (like clips 320, 420 in FIGS. 9-10) or the spiral courses all or nearly all lying in the same plane (like clips 220 and 220 in FIGS. 7a and 11), or more three dimensional with the helical or spiral courses spacing out along a longitudinal centerline of the clip (like Clip 220' in FIG. 7b). In the latter case the wire preferably spirals out from a central portion 22c to form a relatively wide base distal to the dart (like 220 in FIG. 8a).

While a two chambered gasket body 30 has been disclosed, only one chamber or more than two chambers may be provided. While silicone is preferred as a material for an oven gasket body, the silicone can be a conventional, general purpose, non-porous variety or a porous foam. One such foam is Dow Corning SILASTIC® Silicone Sponge Rubber, a compound system including a sponge base material (HB-ES 5000) and a curing agent (AMS-5000). This particular silicone rubber material has the ability to be relatively sharply bent at a right angle (90° turn), with a minimal radius of curvature to the bend and as such bends would normally be made in such appliances, without surface deformation of the gasket body at such bend. That is, the foam material can be relatively sharply bent without buckling or collapsing or even raising a rippling or wrinkling on the surface of the gasket body on the inner side of the bend, which occurs with virtually all other known conventional gasket body materials including conventional non-porous silicone rubber materials. This is particularly aesthetically desirable on an appliance gasket or other gasket exposed to view. It also fosters the making of a good seal, avoids the necessity of joints at bends and provides a much desired uniformly smooth surface appearance. Typical properties for this material are reproduced in the following table:

| ASTM | Property (Post-cured) | Unit | Value |
| --- | --- | --- | --- |
| D792 | Specific gravity | | 0.37 |
| | Density | (lbs/ft) kg/m | (23.1) 370 |
| D2632 | Resilience | % | 52 |
| D1056 | Compression defection 25% | (psi) kPa | (4) 27.6 |
| | Compression deflection 50% | (psi) kPa | (13) 89.6 |
| D395 | Compression set, 22 hours at 150° C. (302° F.): | | |
| | 25% deflection, 0.5 hour rest | % set | 16.24 |
| | 50% deflection, 24 hours rest | % set | 13.1 |
| D395 | Compression set, 22 hours at 100° C. (212° F.): | | |
| | 50% deflection, 24 hours rest | % set | 5.56 |

-continued

| ASTM | Property (Post-cured) | Unit | Value |
|---|---|---|---|
| D7846 | Low temperature brittleness, 3, minutes at −55% C. (−67° F.) | | No cracks |
| | Water absorption, maximum change in weight | % | 1.5 |

Properties are obtained using a suggested formulation of 100 parts Dow Corning SILASTIC HB-ES5000 Sponge Base with 1 part Dow Corning SILASTIC AMS-5000 Sponge Curing Agent and 0.1 part 2,5 dimethyl 2,5 di-t-butylperoxyhexane on 25.4 mm round extruded profiles, hot air vulcanization (HAV) 10 minutes at 240° C. (482° F., post-cured for 4 hours at 200° C. (392° F.).

FIG. 6 depicts an exploded view of one sample use of sealing device 10 of the present invention. The sealing device 10 is mounted between the body 52 of the thermal appliance such as an oven 50 or refrigerator or other supporting structure and a door 54 or other movable or removable panel thereof, so as to at least thermally seal a gap that is normally provided between the body 52 or other support and the door 54 or panel and thereby sealing the gap and sealingly enclosing the interior of the container body or other protected area from air flow. As shown in FIG. 6, the elongated, flexible polymer gasket/sealing device 10 is mounted to the inner face 53 of door 54 (or other movable/removable panel or other support) of an oven 50 (or any other hot or cold operating thermal appliance or device) by inserting the dart 26 of each clip fastener 20 into one of the mounting holes 56 on the door 54. Once the engagement portion (dart) 26 of each fastener 20 is inserted into the respective mounting hole 56, the base 24 of each of the clips 20 is forced by the compression of the dart 26 and resulting bias of the dart 26 into the hole 56 to press the one side 34a of the outer wall 34 of body 30 towards the supporting door/panel 54. Alternatively, the device 10 could be mounted to the face 51 of the body 52 of the oven 50 to close the gap that is left when the door 54 is rotated against the face 51 of the oven body 52 to cover the heated interior 55 of the oven.

While an oven gasket is depicted, sealing devices of the present invention could be used on other appliances such as refrigerators and freezers and still other appliances and devices where such flexible gaskets have been previously used to provide a fluid (air and/or surface water) seal. Some other uses (e.g. vehicles and buildings) have already been mentioned, but still other uses and structures that might benefit from the present invention will be known to those of ordinary skill.

Thus far, the present invention has been described with respect to pinhole openings 37 with wire spring clips 20. Gasketing is also known where individual, so called "flat" spring clips are used in the same way as wire spring clips. Such "flat" clips are typically fabricated by cutting planar rectangular strips of material from a longer planar sheet and then forming the strip into a spring clip by bending the clip along its length to form a base position with the free ends of the strip and an engagement (dart) portion with the middle of the strip between the distal ends. The cut strips have a width which is much less than their length but many times greater than their thickness. For example, flat clips currently used in certain appliance gaskets may be made from strips 18-20 mm long, with a width of about 2 mm and a thickness of only about 0.4 mm. Because the tips of the strips are generally rectangular, transverse slit openings, like slip openings 137 (phantomed in FIGS. 5a and 5f) are provided. Wire spring clips like clips 20 previously described, have been found to work well with the slit openings 137 typically used with flat clips which are about the width of such clips or a little wider, for example, about 0.4 mm to about 0.5 mm wide for a 0.4 mm wide clip. The wider base that can be formed with a wire spring clip 20 makes worker installation of the gasket in the appliance or other device easier and more securely holds the gasket body against the door or other support.

A significant benefit of the above described construction with individual wire spring clips having rounded cross-sectioned (as opposed to polygonal cross-sectioned) in a flexible/elastic gasket body is that such gaskets would install in exactly the same way as existing self cleaning oven gaskets made of spring wire tubular cores with braided or woven glass fiber yarn outer jackets and round individual wire spring clips such as those disclosed in U.S. Pat. No. 5,806,149, among others, and incorporated by reference herein by its entirety. Such gaskets as well as the gaskets of the present application are manually installed by pushing the dart/engagement end 26 of the clip 20 into a hole 56 or other appropriate opening in the oven door 54 or other support. Such gaskets could be installed by workers in exactly the same way using the same gasket end terminations and even using the same oven doors or at least the same oven door panels. This reduces the need for worker training and the numbers of different parts the manufacturer has to provide.

Figure 12A:
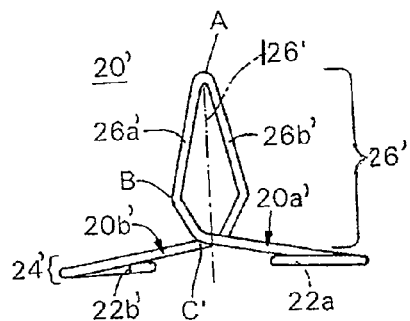
FIGS. 12a, 12b and 12c are respective side elevation, bottom plan and end elevation views, of yet another bent wire, individual spring clip that can be used in the present invention.

While several wire spring clip fastener configurations have been described in which one end of the wire forming the fastener is shaped into a base portion of the clip and a remaining end formed into an engagement portion of the clip, other wire spring clip fastener configurations are known in which the engagement portion of the clip in formed by a middle section of the wire and each of the free ends of the wire are shaped into part of an elongated base portion on either side of the engagement portion. One such wire spring clip fastener is indicated at 20' in FIGS. 12a and 12b. The fastener 20' is made from a single length of at least partially hardened wire 22'. The wire 22' is bent to define an at least generally planar base portion or "base" 24' and a generally planar, generally diamond-shaped engagement portion or dart 26' projecting from one major planar side 25' of the base 24'. The dart or engagement portion 26' is preferably formed generally at the center of the length of wire 22' by bending the wire at three places (A, B, C') preferably into the indicated rhomboidal/generally diamond shape to form the pair of opposing side portions or "sides" 26a', 26b' of dart 26'. The free end portions of the wire 22' are bent at C' preferably to form an included angle greater than 130 degrees, and are extended past one another, side by side, the crossing defining the end of the dart 26' proximal the base 24'. The remaining free end portions of the wire 12' are bent again (at D' in FIG. 12b) generally in a plane perpendicular to the dart 26' so as to partially wrap about one another and to extend away from the dart 26' in opposing directions. The base 24' is completed by curling the remaining free end portions of the wire 22' into separate loop portions 28a', 28b', which preferably are circular closed loops. More particularly, the extreme opposing free ends or tips 22a', 22b' of the wire 22' preferably are each wrapped (counter clockwise in FIG. 12b) under other respective portions of the wire 22' intermediate the ends 22a', 22b' and the crossing, so as to overlap with such other intermediate portions and define opposing, completely closed portions 28a', 28b' of the base 24'. Preferably each closed portion 28a', 28b' is an at least generally circular closed loop as shown, although other closed perimeter shapes could be used and formed in other ways. It is further noted that the shape of each half of the wire 12' extending away form the medial bend is identical. As a result, the first portion 28a is a reversed mirror image of the second portion 28*b*' of the base 24' on opposing lateral sides of the central longitudinal axis 126' of dart 26 when the base 24 is viewed in plan as in FIG. 12*b*.

Figure 12B:
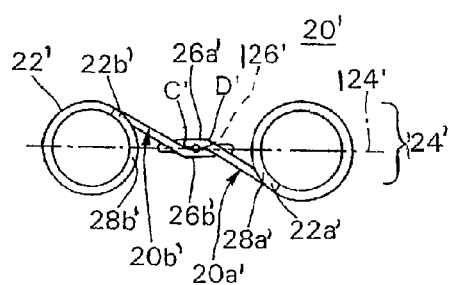

Each of the dart 26' and the base 24' is generally planar and defines a plane in which each respectively lies. The plane of the dart 26' is parallel to the plane of FIG. 12*a*. The dart 26' has a central longitudinal axis 126' which is located in the plane of the dart 26'. The plane of the base 24' is parallel to the plane of FIG. 12*b*. The base 24' also has a central longitudinal axis 124', which is located in the plane of the base. Each central longitudinal axis 126' and 124' is greater in magnitude than any lateral axis and (width) dimension of the dart and base, respectively, that is perpendicular to its central axis 126' and 124', respectively, in the planes of the dart and base, respectively. Furthermore, as can be seen in FIG. 12*b*, the dart 26' is at least generally centered on the base 24' such that the central longitudinal axes 26' of the dart and 24' of the base generally intersect one another and lie in and are coplanar with the plane of the dart 26'. The plane of dart 26' divides medial bend A and passes between the dart sides 26*a*', 26*b*' at the crossing. The plane of base 24' is perpendicular to the plane of dart 26'

Figure 12C:
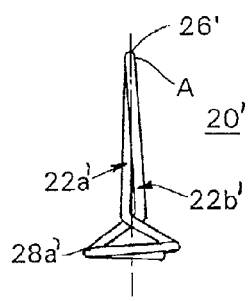

Medial bend A defines two adjoining halves or "arms" 20*a*', 20*b*' of the fastener 20'. The arms 20*a*' and 20*b*' are preferably identical to one another and, as can be seen from FIG. 12*a*, extend away from the medial bend A in the wire 22', which defines the tip of the dart 26' distal to the base 24', and away from one another on initial sides of the longitudinal axis 126' to bend B. At bend B and again at bend C', the sides portions 26*a*', 26*b*' of the arms 20*a*', 20*b*' then extend toward one another and finally cross by one another, side by side, generally at the central longitudinal axis 126' of dart 26' to respective opposite sides of that axis 126'. The crossing defines the end of the engagement portion (dart) 26' proximal to and abutting the base 24'. The remaining free ends of the arms 20*a*', 20*b*' thereafter extend away from the crossing and apart from one another and remain on the respective opposing sides of the central longitudinal axis 126' of the dart 26' while defining the base 24'. Each of the remaining free ends of the arms is bent back upon another portion of that arm intermediate the tip of that arm and the crossing or dart 26' and overlaps with such other portion generally in the plane of the base 24', which is perpendicular to the plane of the dart 24', so as to define the closed portions 28*a*', 28*b*', respectively. Each of the two halves or arms 20*a*', 20*b*' of the depicted, preferred embodiment fastener 20' is identical when viewed on end as in FIG. 12*c*.

Figure 13A:
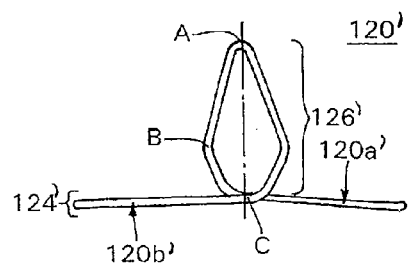
FIGS. 13a, 13b and 13c are respective side elevation, bottom plan and end elevation views, of yet another bent wire, individual spring clip that can be used in the present invention.
Figure 13B:
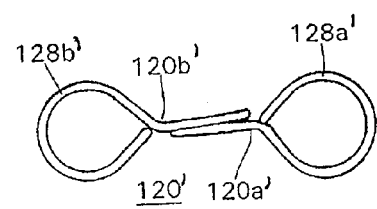
Figure 13C:
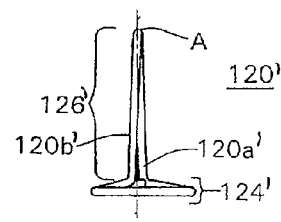
Figure 14A:
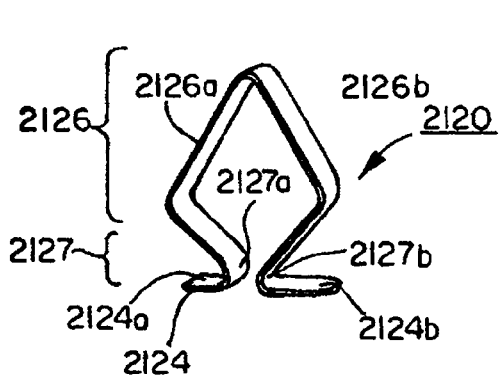
FIGS. 14a-14c depict diagrammatically, different styles of so-called flat individual metal spring clips used with silicone foam gasket bodies.
Figure 14B:
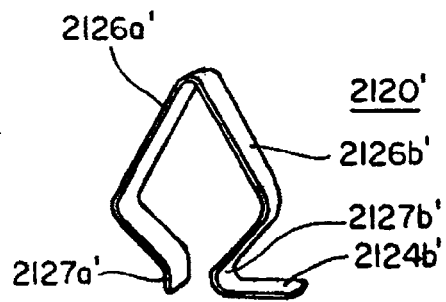
Figure 14C:
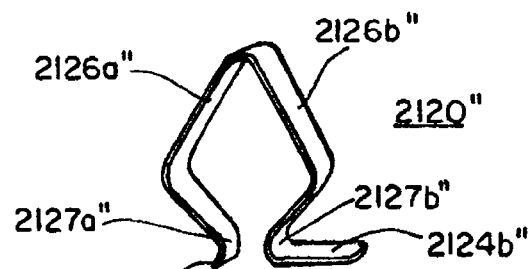
Figure 15:
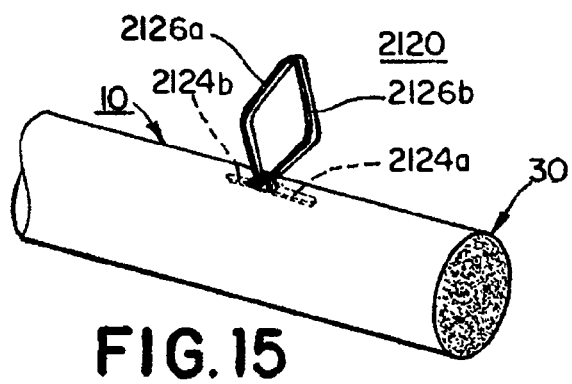
FIG. 15 depicts one of the spring clips of FIG. 14a, in a silicone foam gasket body.

FIGS. 13*a*-13*c* depict a yet another embodiment bent wire spring clip fastener indicated generally at 120' having a dart 126' substantially identical to that of fastener 20' but with a different base indicated generally at 124'. Rather than overlapping the remaining extreme free ends or tips of the wire forming fastener 120' with portions of the wire intermediate the dart 126' and those ends, the remaining extreme free ends or tips of the wire are butted against such intermediate portions forming at least generally circular, completely closed loop portions 128*a*', 128*b*', that are planar and only as thick as the thickness of the wire and preferably at least generally coplanar with one another and the plane of the base 124'. Again, medial bend A defines two arms which are preferably identical and which extend away from one another and opposite sides of the bend A. Again, the plane of dart 126' passes through medial bend and between the sides of the dart 126' at the crossing and the plane of base 124' is perpendicular to the plane of dart 126'. One of the difference between base 124' and the base 24' is that distinct bends D and D' are eliminated in base 124'.

Another aspect of the invention is the use of so-called flat metal spring clip fasteners with elongated elastomeric gasket bodies 30' of the one of the foam silicone materials previously described. The fasteners 2110, 2110' and 2110" are generally the same and differing only in their respective base portions 2124, 2124' and 2124" and, in particular, the length of one of be base ends 2124*a*, 2124*a*' and 2124*a*". The base portions can be captured in preformed interior chambers or simply inserted into the gasket material itself under the outer surface of the gasket. Wire spring clip members with the same type of asymmetric base portions could also be used with such "solid" gasket bodies.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:
1. A method of making an elongated, flexible gasket comprising the steps of:
providing an elongated flexible body formed by a length of tubular polymer material, the body including an outer wall of the polymer material at least partially surrounding and at least partially defining a hollow chamber within the body extending uniformly in cross sectional shape and dimension along the length of the body;
providing a plurality of individual openings spaced apart from one another along the length of the body passing through the outer wall and into the hollow chamber; and
inserting into each opening, a generally planar base portion of one of a plurality of individual spring clip fasteners such that the base portion of each fastener is captured within the hollow chamber and an engagement portion of each fastener extends out of the body and transversely away from the base portion, and away from the opening and the outer wall of the body, each spring clip fastener is formed by a length of metal wire at least partially hardened for resiliency and having a rounded cross-section and being bent to form the base and engagement portions, the base portion of each individual spring clip fastener having a maximum length dimension in an elongated direction of the base portion and a maximum width dimension in a direction at least generally perpendicular to the elongated direction and length dimension, the maximum width dimension being smaller than the maximum length dimension, the base portion of each spring clip fastener having two opposing longer sides longer in length than a maximum cross sectional dimension of the hollow chamber and two opposing shorter ends connecting the longer sides, at least one of the shorter ends being curved, the engagement portion of each individual spring clip fastener having a maximum length dimension in an elongated direction of the engagement portion at least transverse to the elongated direction of the base portion, and a maximum width dimension less than the maximum length dimension of the engagement portion in a direction at least generally perpendicular to the elongated direction of the engagement portion, the maximum width dimension of the base portion and the maximum width dimension of the engagement portion each being greater than a maximum nominal dimension of the opening and the engagement portion having a proximal end abutting the base portion with a reduced width dimension less than the maximum width dimensions of the engagement portion and the base portion.

2. The flexible polymer gasket with spring clip fasteners made by the method of claim 1.

3. The flexible polymer gasket made by the method of claim 1 wherein the flexible polymer material is a silicone material.

4. The method of claim 1, wherein the body is formed by a tubular extrusion of an elastomeric polymer material, and wherein the step of inserting further comprises the steps of:
   inserting one curved shorter end of a separate one of the individual spring clip fasteners into one of the openings to stretch the elastomeric material sufficiently to fully receive the one curved end of the spring clip fastener;
   stretching the opening further with the spring clip fastener in the elongated direction of the body and inserting the base portion into the stretched opening until the entire base portion is received with the hollow chamber; and
   permitting the elastomeric material of the body to relax whereby the opening returns towards it original size such that the base portion remains captured within the hollow chamber while the engagement portion of the spring clip fastener is exposed outside the body extending away the base portion and from the opening and the body.

5. The flexible polymer gasket with spring clip fasteners made by the method of claim 4.

6. The flexible polymer gasket wherein the elastomeric material is a silicone material as made by the method of claim 5.

7. The method of claim 4 wherein the maximum length of the base portion is at least twice and great as the maximum width of the base portion, wherein the engagement portion of each individual spring clip fastener is generally centered on the base portion centrally between the two opposing longer sides and the two opposing shorter ends and wherein the step of stretching comprising stretching the opening in an elongated direction of the flexible body to fully insert the base portion into the hollow chamber a distance greater than the opening is stretched transversely by inserting the one curved shorter end of the spring clip fastener in the opening.

* * * * *